UNITED STATES PATENT OFFICE.

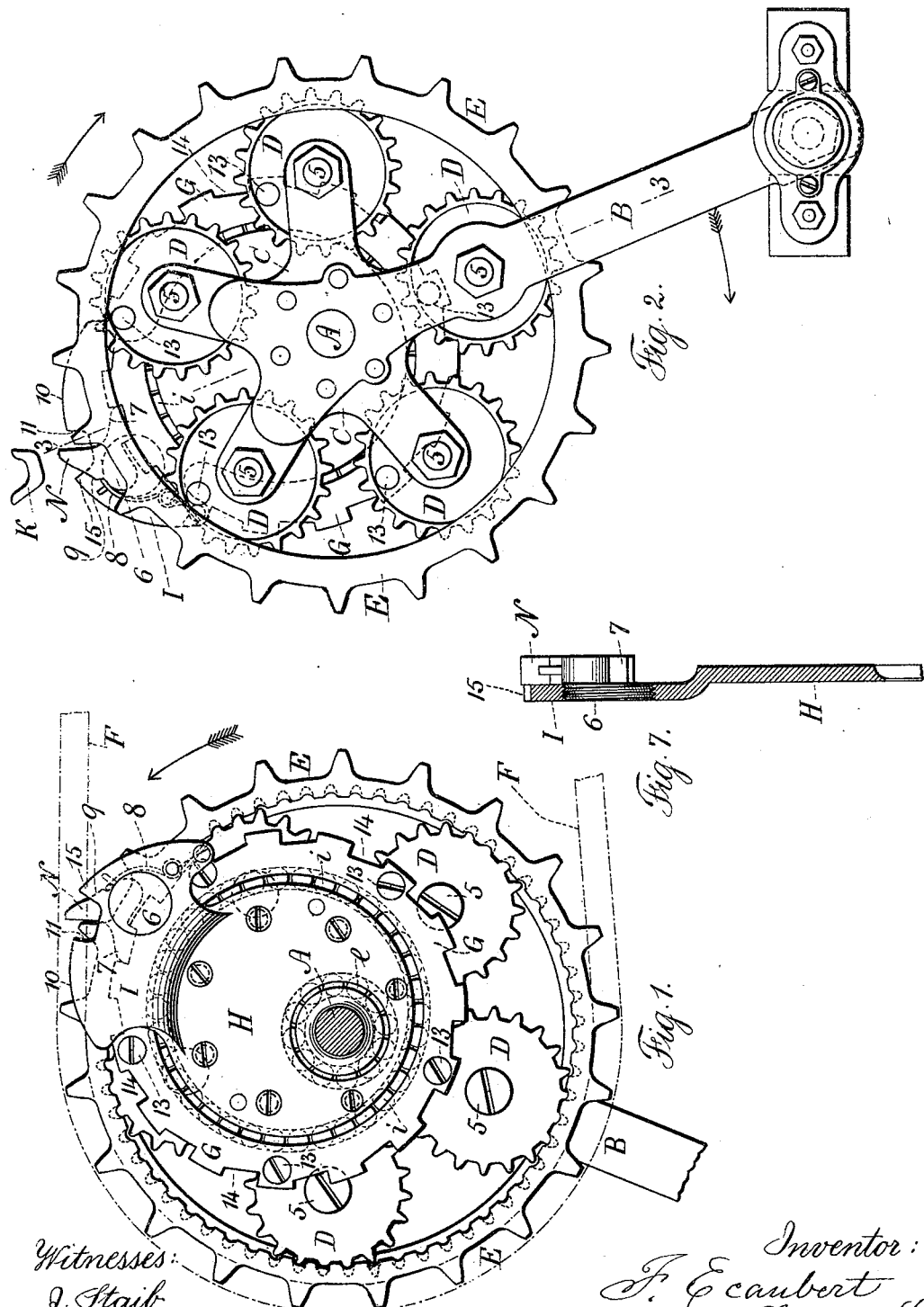

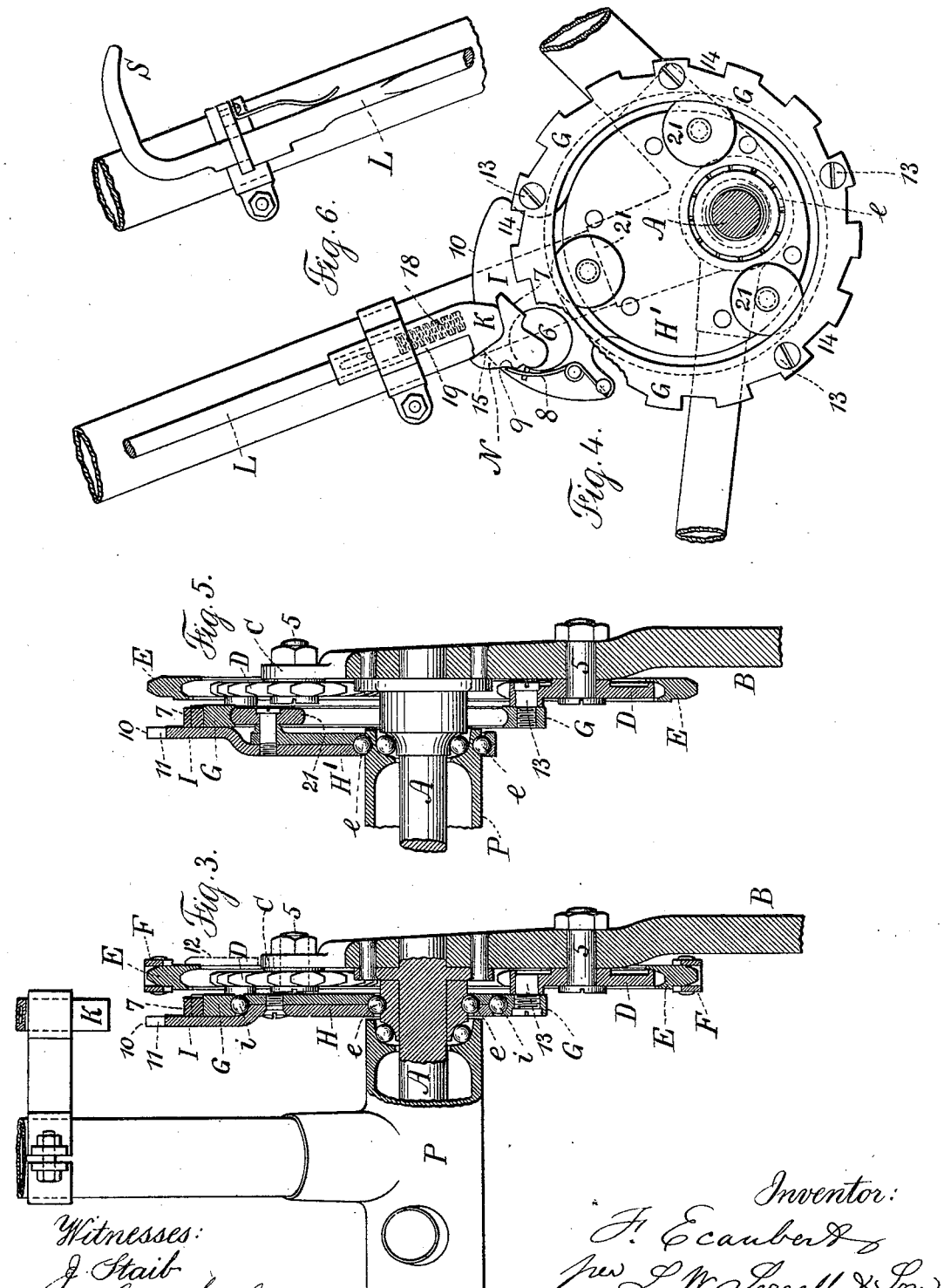

FREDERIC ECAUBERT, OF BROOKLYN, NEW YORK.

SPEED-GEAR FOR TRANSMITTING POWER IN BICYCLES.

SPECIFICATION forming part of Letters Patent No. 582,779, dated May 18, 1897.

Application filed January 24, 1896. Serial No. 576,633. (No model.)

*To all whom it may concern:*

Be it known that I, FREDERIC ECAUBERT, a citizen of the United States, residing at Brooklyn, in the county of Kings and State of New York, have invented an Improvement in Speed-Gears for Transmitting Power in Bicycles, &c., of which the following is a specification.

The object of the present invention is to provide means for varying the relative speeds of the motor or crank shaft that is driven by the pedals and the driven wheel, so that in bicycles the sprocket-wheel of the crank-shaft can be directly connected to and revolved with such crank-shaft, or intermediate gearing can be brought into action for allowing the crank-shaft to be revolved at a faster rate of speed than the sprocket-wheel, thereby giving greater power in propelling the bicycle or other vehicle. I am aware that various forms of changeable gearing have been provided between the sprocket-wheel and the crank-shaft and that the sprocket-wheel has been made as an internal gear to engage pinions that intervene between such internal gear and a pinion upon the crank-shaft. I provide a sprocket-ring that is concentric with the crank or power shaft, and a support, preferably in the form of a stud-plate, around the shaft and advantageously connected directly with the crank. This plate has projecting from it studs that carry small gear-wheels that engage and usually sustain the sprocket ring or wheel, and a crank-pin ring is provided with crank-pins that engage the aforesaid gear-wheels, and the crank-pin ring is eccentric to the driving-shaft. When all the parts are locked together, the crank-shaft and sprocket-wheel are revolved at the same speed, but when the eccentric crank-pin ring is kept in one position but allowed to revolve the crank-shaft and stud-plate carry the pinions around bodily and the crank-pins hold the small gears, so that they are carried around bodily, and they turn the sprocket-wheel at a reduced speed, thereby giving the pedals and cranks greater leverage in driving the vehicle.

In the drawings, Figure 1 is an elevation of the gearing at the rear side. Fig. 2 is an elevation at the opposite or crank side. Fig. 3 is a vertical section at the line 3 3, Fig. 2. Fig. 4 represents the crank-pin ring and a modified supporting device. Fig. 5 is a section similar to Fig. 3, but with the modified support shown in Fig. 4. Fig. 6 represents a handpiece for moving the arrester, and Fig. 7 is a section showing the screw-pivot for the latch.

The crank-shaft A is supported in any suitable manner. I have represented the same as in the bearing P, forming a part of the frame of the machine, and the machine itself may be of any desired size or character, as the present improvement may be employed with a bicycle, tricycle, or other vehicle propelled by foot-power acting through pedals and cranks upon the motor-shaft, and it is usual in vehicles of this general character to employ an endless chain between a sprocket-wheel upon the shaft of the driven wheel and a sprocket-wheel that is driven by the crank-shaft and pedals. These parts, however, form no necessary part of the present invention. I have represented a portion of the chain at F, Fig. 3, and as passing around the sprocket-ring E by dotted lines in Fig. 1.

The cranks upon the crank-shaft A are usually at one hundred and eighty degrees apart, and adjacent to the crank B is a stud-plate C. This stud-plate is permanently connected with the crank-shaft, and it may be separate from the crank B, but I prefer to make such stud-plate C and crank B in one and to fasten them upon the end of the crank-shaft in any usual or desired manner—such, for instance, as by a pin or key and nut. Upon this stud-plate C there are studs 5, which may vary in number. I have shown five of such studs at equal distances apart, and upon these studs are pinions or gears D, sufficiently small not to touch each other and not to come in contact with the crank-shaft, and these gears D receive around them the wheel or sprocket-ring E, the exterior of which is adapted to receive and engage the chain F when the improvement is applied to a bicycle, and the interior of such ring is adapted to engage the gears D. I prefer to make the teeth upon the gears D tapering, so that they enter corresponding indentations or recesses in the interior of the sprocket-ring, but ordinary gear-teeth may be made use of; and I remark that this sprocket-ring always remains concentric with the crank-shaft, and hence it may be provided with plates or flanges at one or both sides to inclose or partially inclose the gears D for keeping out dust and for forming bearings or supports for the wheel. In Fig. 3 I have illustrated by dotted lines 12 an annular flange or plate extending from the sprocket-ring to the stud-plate for excluding dust or foreign substances from the gears, but it is not necessary, as the sprocket-ring will be held in place by the gear-teeth which pass into the recesses in the inner surface of the ring and between the inwardly-projecting flanges of the ring. There should be three or more of the gears D. There is a gear-holding device, preferably in the form of a crank-pin ring G, from which project crank-pins 13, that pass into holes in the gears D and serve to hold such gears D as their studs 5 carry the gears around bodily and revolve within such gears, and this crank-pin ring G is eccentric to the shaft A. The center of this ring G is the same distance from the center of the crank-shaft A as the radius of the circles described by the crank-pins 13 as the gears D pass around them, and to lessen friction I introduce ball-bearings $e$ between the crank-shaft and the eccentric H and ball-bearings $i$ between the outer edge of the eccentric H and interior of the crank-pin ring G.

Extending out from the eccentric H is a latch-plate I. I find it convenient to make the eccentric H in two parts, so as to introduce the balls into the respective bearings and then attach the two parts of the eccentric together for holding the balls in place, and the latch-plate I in this mode of construction is integral with the interior half of the eccentric H, and this latch-plate projects at one side and is made with a notch 11 adjacent to the incline 10, and at the opposite side of the notch to the incline the latch N is pivoted at 6 to such latch-plate I, and this latch is formed with a block at 7, adapted to engage one of the notches 14 in the exterior edge of the crank-pin ring G, and the latch N has a projection 15, adapted to be engaged by the arrester K, hereinafter described, and the spring 8 presses the latch-block 7 toward the crank-pin ring G, and when the projection 15 is taken by the arrester K the block 7 is drawn back from the crank-pin ring G to disconnect the same, and the spring 8 runs up the incline 9 upon the latch, so as to lessen the force of the spring, but when the arrester K is moved away from the projection 15 the spring 8 runs down the incline 9, and the end of the spring tends to block the latch, so as to hold the latch reliably in engagement with the crank-pin ring G.

The arrester K is in the form of a slide adapted to engage the latch and to pass into the notch 11, and it may be constructed and moved in any suitable manner. I have represented this arrester K in the form of a slide or bolt that is to be guided and sustained, and it is provided with a rod L, extending to a handle in a convenient position for the rider, and there is a suitable spring that will allow of a movement of the arrester when the incline 10 comes in contact with it. I have shown a helical spring 18 in a tubular case 19, forming part of the arrester or bolt; and which spring yields when the arrester K is moved by the contact therewith of the incline 10.

The operation of the parts thus far is that in the normal position for use the arrester K is out of the way, as in Figs. 2 and 3, and the latch N engages one of the notches in the crank-pin ring G, and hence the parts are locked together and the cranks rotate the crank-shaft A, the eccentric H, the crank-pin ring G, and the crank-pins 13 being carried around bodily with the other parts do not rotate the gears D, and such gears do not turn on their studs 5; but by the engagement of the teeth of the gears D with the teeth on the interior of the sprocket-ring such sprocket-ring is propelled at the same speed as the crank-shaft and the intermediate parts, and a maximum of speed in driving the sprocket-wheel and the chain is obtained. If now the handle S and rod L are moved to bring the arrester K toward the crank-shaft, the incline 10 comes into contact with the arrester and pushes it back slightly, the spring 18 yielding, and the latch N comes into contact with the arrester, and its block 7 is liberated from the crank-pin ring simultaneously with the arrester, springing back into the notch 11 and holding the latch-plate and eccentric in a rigid position. The crank-shaft A continues to revolve, and the ball-bearings $e$ within the eccentric prevent undue friction between the shaft and the eccentric, as such eccentric is held stationary, and the crank-shaft as it continues to revolve carries with it the stud-plate C and the studs 5 of the gears D, and the crank-pin ring G and crank-pins 13 revolve around the stationary eccentric H and cause the gears D to be carried around bodily without revolving. Hence the speed given to the sprocket-ring is slower than the movement of the shaft A and stud-plate to the extent of the circumference of either gear D and the power correspondingly increased. It will be apparent upon reference to Figs. 1 and 2 that the end of the latch N projecting above the incline 10 engages the arrester K as the latter is brought down upon the incline, and there is no possibility of the pawl failing to unlatch because the parts assume the position shown in Fig. 6, and in this manner the latch N is positively disconnected from the crank-pin ring G, and simultaneously the eccentric H and latch-plate I are positively stopped because the end of the latch-plate at the opposite side of the notch to the incline 10 is higher than such incline, and this part stops positively against the arrester K with the arrester directly over the notch, ready to pass into the same and assume the position shown in Fig. 4. Hence the operations are of the most reliable character. As soon as the arrester K is moved back out of the way of the latch N and of the latch-plate I the spring 8 instantly returns the block 7 of the latch into an adjacent notch 14 in the crank-pin ring and thus locks all the parts together, so that they again revolve with the crank-shaft and at the speed thereof. By this improvement the rider is enabled to change the relative speeds of the crank-shaft and the driving-wheel instantly without changing the direction of movement of the cranks and pedals, and the parts are strong and light and not liable to get out of order.

I have represented in Fig. 5 the studs forming the crank-pins 13 as screwed into the ring G and having heads countersunk in the gears D, whereby the parts are reliably connected together, and I remark that the ball-bearings between the eccentric and the crank-pin ring may be dispensed with, if desired.

In Figs. 4 and 5 I have shown rollers 21 upon the part H' of the latch-plate I as coming within the crank-pin ring G for keeping the parts in the proper relative positions and allowing such crank-pin ring to revolve eccentrically as it is carried around by the crank-pins and wheels D. In this arrangement the rolls 21 take the place of the eccentric H and become its equivalent in holding the crank-pin ring in its proper position to the latch-plate and latch. If the parts are arranged so that a wheel is connected with and surrounds the ring E, the said wheel may be driven by the shaft when locked thereto, as aforesaid, or slower through the intervening gearing. In this case the wheel E is simply an internal gear instead of a chain-wheel. If the speed-gearing is brought into action between the crank-shaft and the sprocket-wheel in a bicycle when the bicycle is going downhill, the pedals have a leverage by which to control the momentum, and a brake may be rendered unnecessary.

While the present improvement has been especially devised for a speed-gear for bicycles, its use is not limited in this particular, and the improvement is substantially a novel mechanical motion.

I find that it is convenient to screw-thread the pivot 6 of the latch N and screw the same into the latch-plate I, the screw turning loosely in its screw-threaded hole. By this means I am enabled to make use of a large-sized pivot to obtain the necessary strength, and the parts are effectually supported against lateral motion, and the latch cannot become disconnected because it cannot be turned backward upon its screw-threaded pivot after the spring 8 has been introduced into its place or the other parts put together. The leverage of the cranks will be greater when the wheels D are large and less when said wheels are smaller. The latch when in action is carried around with the parts that are latched by it, and it is thrown out of action by contact with the arrester, by which it is held stationary, and the latch when liberated always engages an adjacent notch in that part of the crank-pin ring that is farthest from the supporting-shaft A.

In speed-gears, especially those for bicycles, it is very important that they occupy but little space and are as light as possible. In consequence of the studs 5 projecting from one side and receiving on them the gears D, and the crank-pins 13 projecting from the other side into such gears, the supporting and rotating devices are in the same plane as the gears and sprocket-wheel and there is but little space occupied, and the actions are direct and there is little or no lateral strain or tendency to displace any of the parts, and they can be comparatively small and light and at the same time very strong, and any central gear is dispensed with.

It will be apparent that the circular range of studs 5, that carry the wheels D, have the shaft A for their common axis, and that the crank-pins 13, projecting from the crank-pin ring, are also equidistant and are at the same distances apart as the studs 5, and hence that the crank-pin ring being eccentric to the circular range of studs the crank-pins will always be in parallel planes passing through the crank-pins and the studs, and when the parts are locked together they rotate as a whole around the axis A as a common center and give a corresponding movement to the sprocket-ring E or other device surrounding the circular range of small gears, and when the parts are not locked together and the eccentric H is held in a fixed position the circular range of studs rotates around a common center, and the crank-pins turn the gears each a complete revolution as the studs make a complete revolution around their common center, and by locking the eccentric so as to hold it in a fixed position, simultaneously with the unlocking of the crank-pin ring, the speed is changed without opportunity for the parts to slip or become misplaced, and by allowing the locking-pawl to engage and hold the crank-pin ring simultaneously with the liberation of the eccentric all the parts are locked together and travel as a whole.

I claim as my invention—

1. The combination with the crank-shaft, cranks and pedals, of studs and a stud-plate connected to and revolving with the crank-shaft, gear-wheels carried by the studs, a sprocket-ring surrounding and supported by the gears, an eccentric-ring and crank-pins carried by that ring and passing through holes in the gears, and means for locking the crank-pin ring so as to revolve with the crank-shaft and for disengaging the locking device and holding the crank-pin ring in an eccentric position for the crank-pins to rotate the gears as the gears are carried bodily around by the crank-shaft and stud-plate, substantially as set forth.

2. The combination with the crank-shaft, of a stud-plate and a crank therewith connected, studs upon the plate and gears supported by the studs, a sprocket-ring surrounding the gears, crank-pins engaging the gears and an eccentric crank-pin ring supporting the crank-pins, an eccentric within the crank-pin ring, a latch-plate connected with the eccentric and a latch carried by such plate and engaging the crank-pin ring, an arrester and means for moving the same out of the path of the latch or into the path of the latch to disconnect the latch from the crank-pin ring and hold the eccentric and latch stationary or the reverse, substantially as set forth.

3. The combination with a circular range of studs and means for connecting the same to a central axis of rotation, of wheels having peripheral projections and supported by the studs, a crank-pin for each wheel, means for supporting the crank-pins and maintaining them at uniform distances apart corresponding to the distances apart of the studs, a sprocket-ring or device to be moved passing around and engaging the projections of the small wheels, means for holding the crank-pins in a fixed position in relation to the other parts, so that they revolve as a whole around such central axis, means for retaining the circular range of crank-pins in a position eccentric to the axis of rotation when the devices that connect such crank-pins with the common axis have been released, substantially as set forth.

4. The combination with the shaft, stud-plate, studs and gears, of a ring surrounding the gears, crank-pins, a ring for such pins and means for supporting the same eccentric to the shaft, a latch-plate and latch pivoted upon the plate, a spring for acting upon the latch, there being an incline upon the latch for the end of the spring, an arrester supported on the frame of the machine, and a lever-and-spring connection for moving the arrester, there being a notch in the latch-plate into which the arrester passes as it acts upon the latch, substantially as set forth.

5. The combination with the shaft, of a stud-plate and circular range of studs supported by the shaft, gears upon the studs, a ring-gear surrounding the circular range of gears, a crank-pin ring and crank-pins at equal distances apart engaging the gears, means for supporting the crank-pin eccentric to the shaft, a latch-plate and a latch for connecting the crank-pin ring and latch-plate and an arrester acting upon the latch and for holding the latch-plate in a fixed position, substantially as set forth.

6. The combination with a central shaft, of a stud-plate and a circular range of studs supported by the shaft, gears upon the studs, a ring-gear surrounding the circular range of gears, an eccentric and crank-pin ring, and crank-pins engaging the gears, means for holding the eccentric in a fixed position, means for connecting the crank-pin ring with the central shaft so that the parts revolve together when the eccentric is disconnected from the stationary device, substantially as set forth.

7. The combination with a shaft and a circular range of studs and a support for such studs, of small gear-wheels carried by the studs, a ring having internal teeth and surrounding and engaging the small gear-wheels, crank-pins engaging the small gears, a crank-pin ring for carrying such crank-pins, an eccentric within the crank-pin ring and through which the central shaft passes, there being a projection from such eccentric, an arrester for engaging the projection and holding the same and the eccentric stationary, and means for connecting the eccentric and crank-pin ring when the arrester is withdrawn, substantially as specified.

8. The combination with the shaft and speed-gears, of a crank-pin ring, crank-pins carried by such ring and engaging the speed-gears, an eccentric within the crank-pin ring and a projecting latch-plate notched at its outer edge, a swinging latch pivoted to the latch-plate and engaging the crank-pin ring and having one end of the latch adjacent to and rising above the said notch, and an arrester to engage the end of the latch and simultaneously disconnect such latch and hold the eccentric by entering the notch or the reverse, substantially as set forth.

9. The combination with the crank-pin ring, of the latch N having an integral screw-threaded pivot at one side and the plate I into which such pivot is screwed loosely, substantially as set forth.

Signed by me this 21st day of January, 1896.

F. ECAUBERT.

Witnesses:
GEO. T. PINCKNEY,
S. T. HAVILAND.